(12) United States Patent
Cairns

(10) Patent No.: US 7,040,909 B2
(45) Date of Patent: *May 9, 2006

(54) DRY MATE CONNECTOR

(76) Inventor: James L. Cairns, 403 S. Atlantic Ave., Ormond Beach, FL (US) 32174

( * ) Notice: Subject to any disclaimer, the term of this patent is extended or adjusted under 35 U.S.C. 154(b) by 0 days.

This patent is subject to a terminal disclaimer.

(21) Appl. No.: 11/053,544

(22) Filed: Feb. 7, 2005

(65) Prior Publication Data

US 2005/0136722 A1    Jun. 23, 2005

Related U.S. Application Data

(63) Continuation of application No. 10/647,957, filed on Aug. 26, 2003, now Pat. No. 6,910,910.

(51) Int. Cl.
*H01R 13/52* (2006.01)

(52) U.S. Cl. .................. 439/271; 439/462; 439/589

(58) Field of Classification Search ............... 439/271, 439/589, 462, 352, 199–204; 174/13, 24, 174/15.6, 18, 106 D
See application file for complete search history.

(56) References Cited

U.S. PATENT DOCUMENTS

| | | | | |
|---|---|---|---|---|
| 2,886,626 A | * | 5/1959 | Burnett et al. ................ | 174/18 |
| 3,621,447 A | * | 11/1971 | Taylor et al. ................ | 439/204 |
| 3,845,450 A | * | 10/1974 | Cole et al. .................. | 439/141 |
| 3,852,511 A | * | 12/1974 | Artbauer .................... | 174/11 R |
| 4,003,620 A | * | 1/1977 | O'Brien et al. ............. | 439/204 |
| 4,166,664 A | * | 9/1979 | Herrmann, Jr. ............. | 439/258 |
| 4,469,392 A | * | 9/1984 | Edgerton et al. ........... | 439/190 |
| 4,545,633 A | * | 10/1985 | McGeary .................... | 439/141 |
| 4,668,038 A | * | 5/1987 | Burnett et al. .............. | 439/275 |
| 5,054,879 A | * | 10/1991 | Brown ........................ | 385/59 |
| 5,192,948 A | * | 3/1993 | Troyer et al. ............. | 340/855.1 |
| 5,199,100 A | * | 3/1993 | Maas et al. ................. | 385/139 |
| 5,439,386 A | * | 8/1995 | Ellis et al. .................. | 439/322 |
| 5,785,545 A | * | 7/1998 | Holt ........................... | 439/352 |
| 6,152,608 A | * | 11/2000 | Ghara et al. ................. | 385/60 |

* cited by examiner

*Primary Examiner*—Neil Abrams
(74) *Attorney, Agent, or Firm*—Gordon & Rees LLP

(57) ABSTRACT

A dry mate connector has first and second connector modules, and a coupling member or slidable retention sleeve mounted on the first module. Resilient latch formations are provided for releasably securing the modules together in a mated position. The modules each have at least one contact for communication with the contact of the other module within a closed, locked and sealed contact chamber formed by the coupling member and modules in the mated position. Mating, locking and sealing are achieved by movement of the parts in a single, mating direction, and the modules are separated by motion in a single direction opposite to the mating direction, using the same two grip surfaces for both mating and unmating. A collapsible fluid-filled hose with bellows portions may extend between a first connector module and a second connector module in an optical cable arrangement using the dry mate connector.

31 Claims, 7 Drawing Sheets

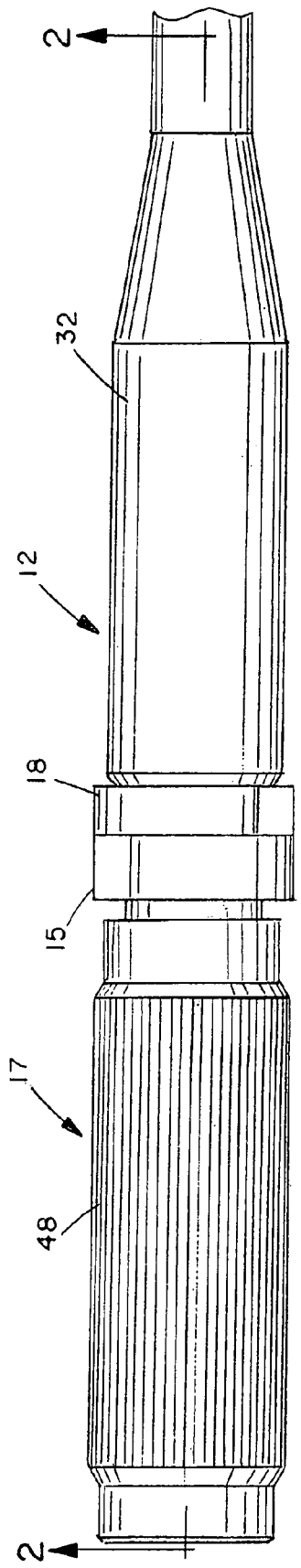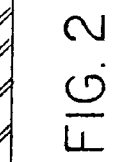

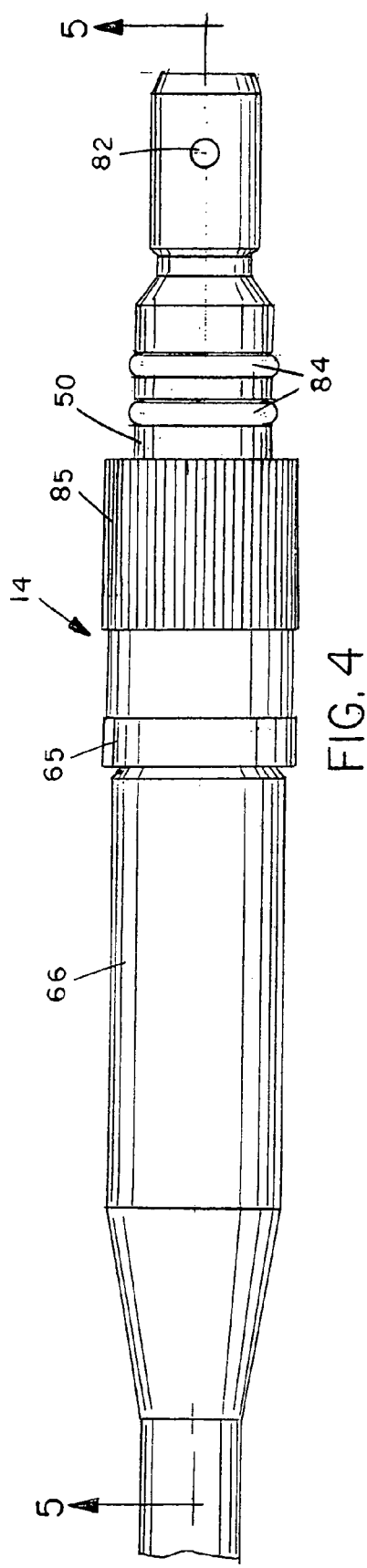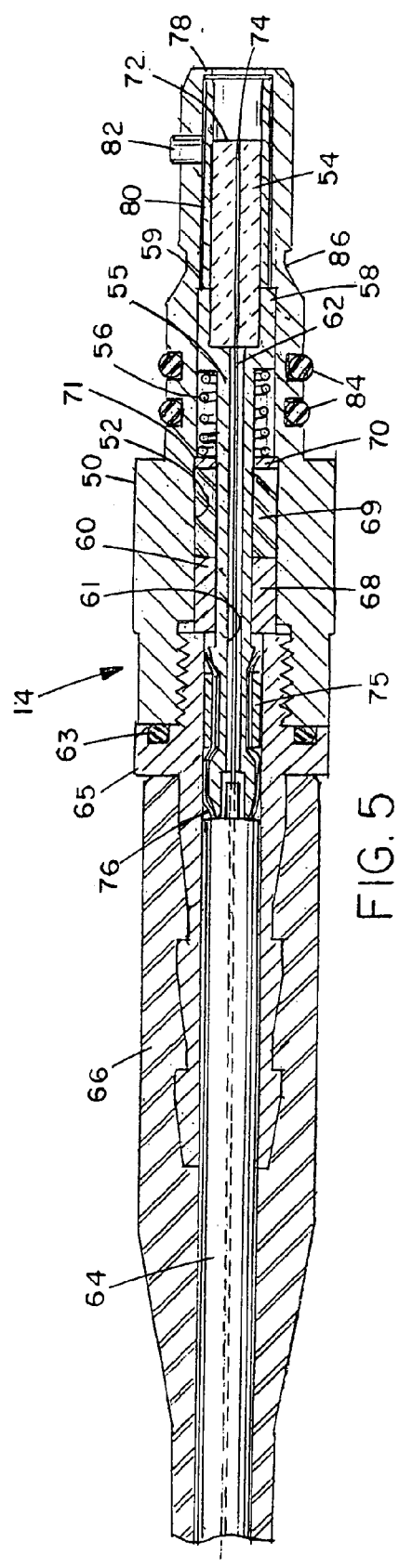

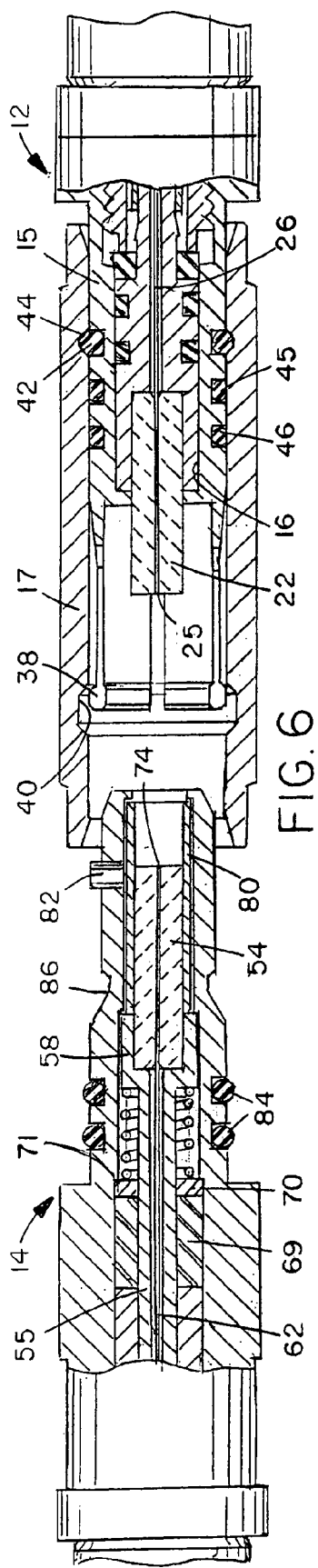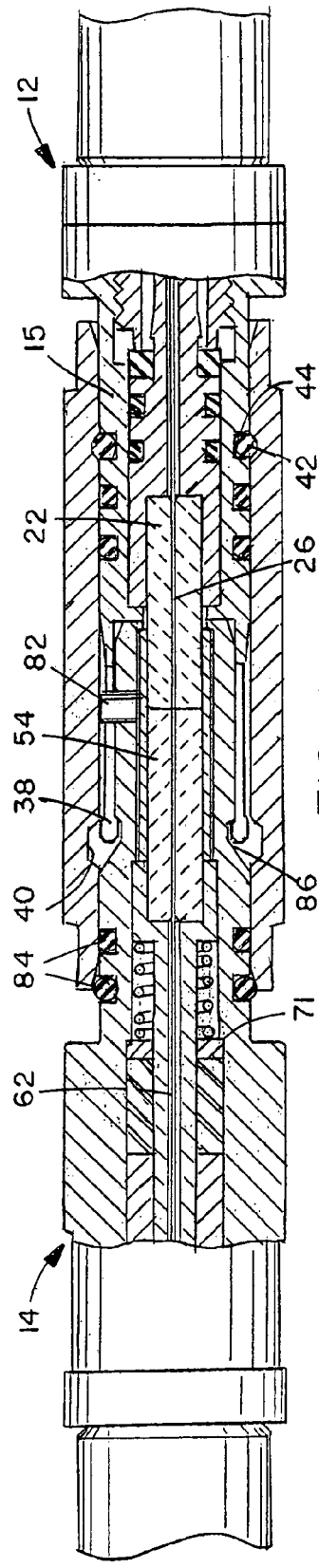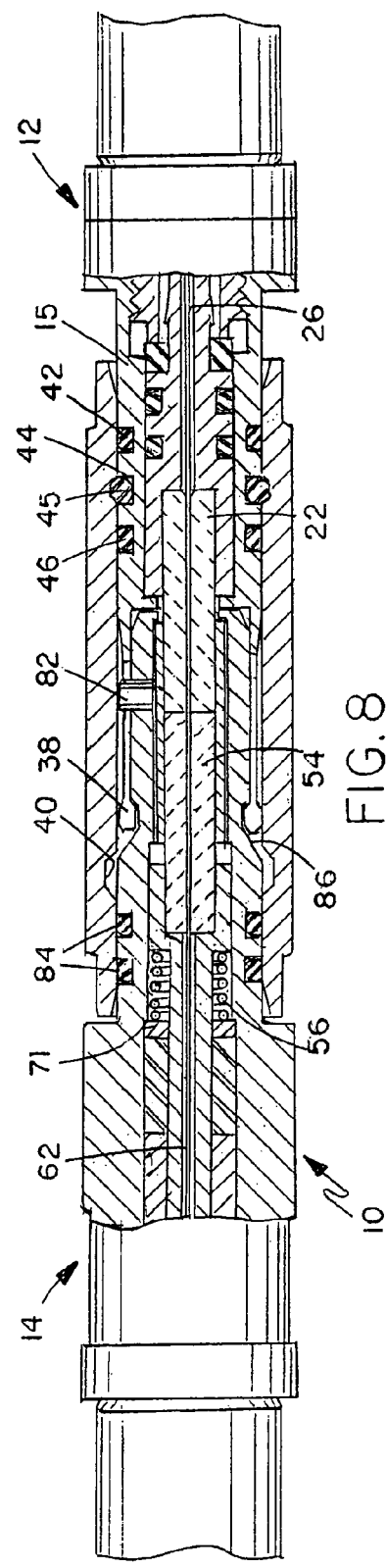

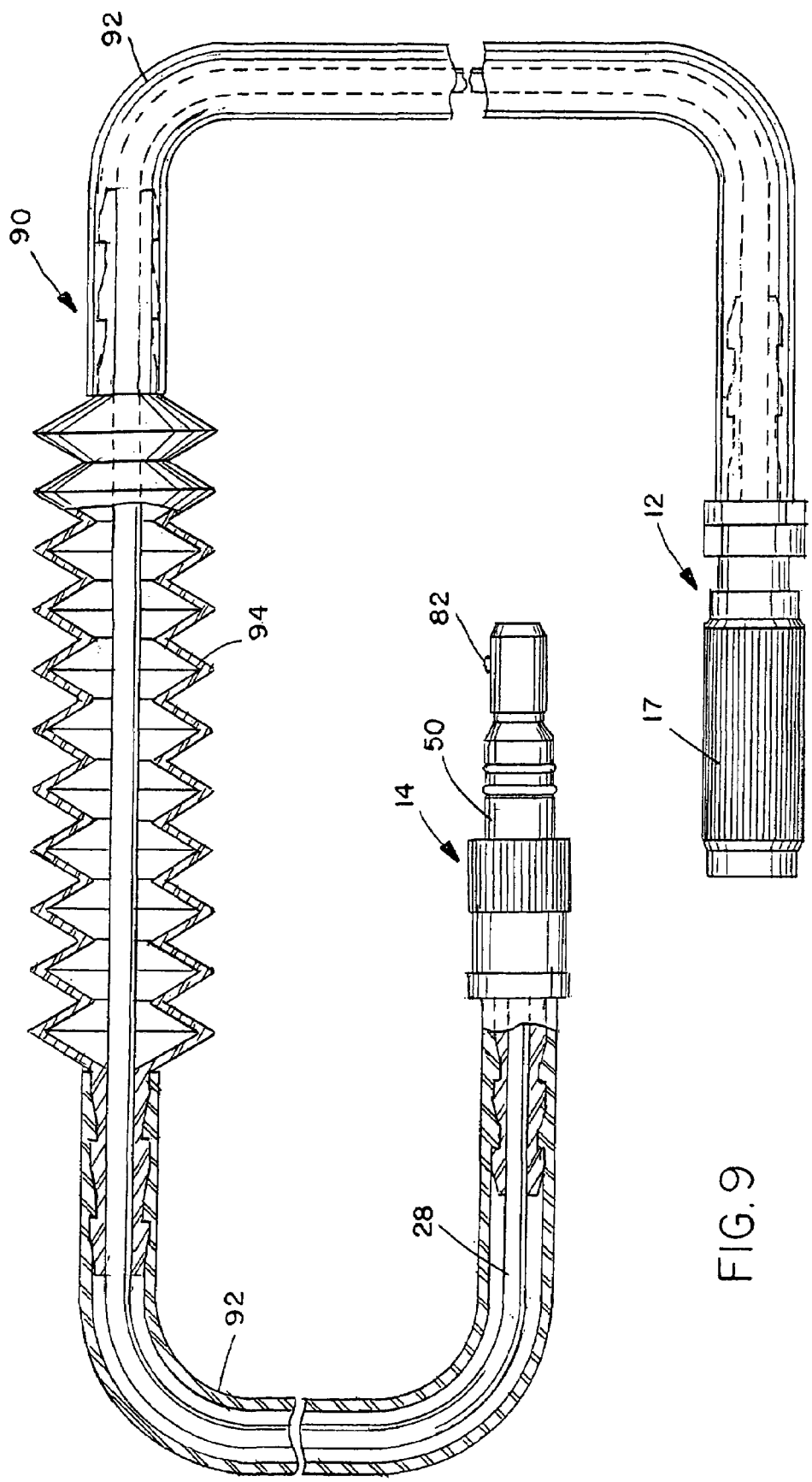

DRY MATE CONNECTOR

CROSS REFERENCE TO RELATED APPLICATIONS

This application is a continuation of application Ser. No. 10/647,957 filed Aug. 26, 2003, now U.S. Pat. No. 6,910,910.

BACKGROUND OF THE INVENTION

The present invention relates generally to optical, electrical and electro-optical connectors for use in harsh or hostile environments, comprising a plug and receptacle for releasably mating engagement in order to connect the ends of two electrical or fiber optic cables, or to connect a cable to an equipment housing or the like, and is particularly concerned with dry mate connectors, which are connected prior to immersion in the hostile environment.

Optical, electrical, and hybrid connectors for use in harsh environments typically comprise a plug unit and a receptacle unit for releasable mating engagement with the plug unit, each unit containing one or more contacts for engagement with corresponding contacts in the other unit when mated. Wet mate connectors are designed to be fully sealed in both the mated and unmated condition, so that they can be connected in the harsh environment if necessary. Dry mate connectors are sealed only when mated, and must be mated before they are submerged or installed in the harsh environment. One such connector is described in U.S. Pat. No. 5,873,750 of Cairns et al. In this case, the receptacle has a reduced diameter end portion which engages in a counterbore at the forward end of the plug. Contact probes in the plug body extending into the counterbore engage in corresponding sockets in the forward end of the receptacle. At the same time, an outer coupling sleeve on the receptacle engages over the forward end of the plug and must be rotated for threaded engagement between the sleeve and plug, simultaneously drawing the plug and receptacle into full mating engagement. Thus, a push and rotate action is required to seal and lock parts of the connector together, i.e. pushing the connector halves together while rotating the outer coupling sleeve.

Dry mate connector assemblies may be used for connecting two cables in line, or connecting a cable through a bulkhead or panel of a housing to instruments within the housing. Such assemblies are often relatively bulky and expensive. There may also be a problem in adequately sealing the chamber or chambers containing the mated contacts after connection, particularly when exposed to extreme environments such as high pressure, oceanic environments. The connection may be awkward for the operator when two different actions are needed to seal and lock the connector parts.

SUMMARY OF THE INVENTION

It is an object of the present invention to provide a new and improved dry mate connector for use in harsh environments such as underwater.

According to the present invention, a dry mate connector is provided, which comprises first and second connector modules, and a coupling member mounted on the first module for releasably securing the modules together in a mated position, the mated modules and coupling member together forming a closed, locked and sealed contact chamber. The two modules each have at least one forwardly facing contact for face-to-face engagement with the contact in the other module within the contact chamber in the mated position. The modules and coupling member are movable relative to one another in a single axial mating motion to move between an unmated and a mated position, and the modules are released simply by pulling them apart in a second, opposite axial motion.

In an exemplary embodiment of the invention, the coupling member and second module each have an outer grip surface for gripping by an operator in order to mate and lock connector modules together, and the same grip surfaces are gripped by the operator in order to release the modules and pull them apart. This makes mating and de-mating simple and easy, with an axial motion, push or pull, required for each action. This is particularly helpful when mating and de-mating has to be accomplished in low light conditions or when wearing gloves.

In one exemplary embodiment, a first contact is seated in the forward end of the first module, the second module having a through bore and a second contact slidably mounted in the through bore, the first contact extending into the through bore in the second module to contact the second contact in the mated position. Seal members are mounted on the outer surface of each of the modules for sealing engagement with the coupling sleeve through bore in the mated position and define opposite ends of the contact chamber in which the mating contacts are located. The chamber therefore has at least one seal at each end to protect the contacts from the surrounding harsh environment when the connector is deployed. The seal members may provide a seal that can support a pressure differential.

In an exemplary embodiment of the invention, a releasable snap lock mechanism is provided for releasably securing the modules together in the mated position. This may comprise an indent on the outer surface of one module and a snap lock member extending forwardly from the forward end face of the other module for snap lock engagement in the indent when the modules are pushed into mating engagement. The coupling member may be a sleeve having a first indent at a spacing from its rear end, and the outer surface of the first module has two retention members spaced rearwardly from the forward end of the first contact, the coupling sleeve moving relative to the first module as the modules are mated together between a first, unmated position in which a first of the two retention members engages in the first indent to retain the coupling sleeve on the first module, and a second, mated position when the modules are mated together in which the second retention member engages in the first indent. At least the first retention member may also be a seal member in the second, mated position, to provide two seal members in sealing engagement with the inner surface of the coupling sleeve. In this case, two spaced seal members seal the rear end of the contact chamber. For simplicity, both retention members may be seal members, and all three seal members on the first module may be O-ring seals.

The coupling sleeve may have a second indent which is aligned with the snap lock member when the modules are separated, to allow the snap lock member to snap into the indent on the second module as the parts are mated. Then, when the second module is pushed further inwardly while gripping the coupling sleeve, the snap lock member is moved inwardly relative to the coupling sleeve bore, so that it is no longer aligned with the second indent and is locked into the locking indent by the coupling sleeve. The coupling sleeve snaps out of engagement with the first retention member and into engagement with the second retention member to accommodate the relative movement between the first module and sleeve to move the modules into the locking position.

The connector in this case is a "push-pull" connector, in which the second module is pushed into the coupling sleeve until the second contact engages the first contact. Further inward force on the second module while gripping the outer surface of the coupling sleeve forces the sleeve indent to snap out of engagement with the first retention member and slide over the second module until the second retention member snaps into the indent, holding the coupling sleeve in the mated position relative to the two modules.

Mating between the two connector modules is therefore accomplished by a simple push to connect and lock the modules together. De-mating is accomplished simply by pulling the modules apart in a reverse of the mating operation, using the same gripping surfaces as the mating operation. The connector is suitable for harsh environments where one or more submersible optic or electrical circuits are needed. The connector may be for a single optical fiber connection or a single or coaxial electrical wire, or may accommodate multiple fiber optic or electrical circuits. In the latter case, each module will have two or more contacts for connection to the optical fibers or electrical wire ends comprising contacts, but will otherwise operate in the same manner as the single circuit, dry mate connector.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 1 is a side view of a first module of a dry mate connector according to one embodiment of the invention.

FIG. 2 is a sectional view taken on line 2—2 of FIG. 1;

FIG. 3 is a sectional view taken on line 3—3 of FIG. 2;

FIG. 4 is a side view of the a second module of the connector;

FIG. 5 is a sectional view taken on line 5—5 of FIG. 4;

FIG. 6 is a sectional view showing the initial connection of the connector modules;

FIG. 7 is a similar view showing partial connection of the modules;

FIG. 8 is a similar view showing the full connection position;

FIG. 9 is a side view, partially cut away, of an adjustable protective jacket, partially cut away;

DETAILED DESCRIPTION OF THE DRAWINGS

Figure 12:
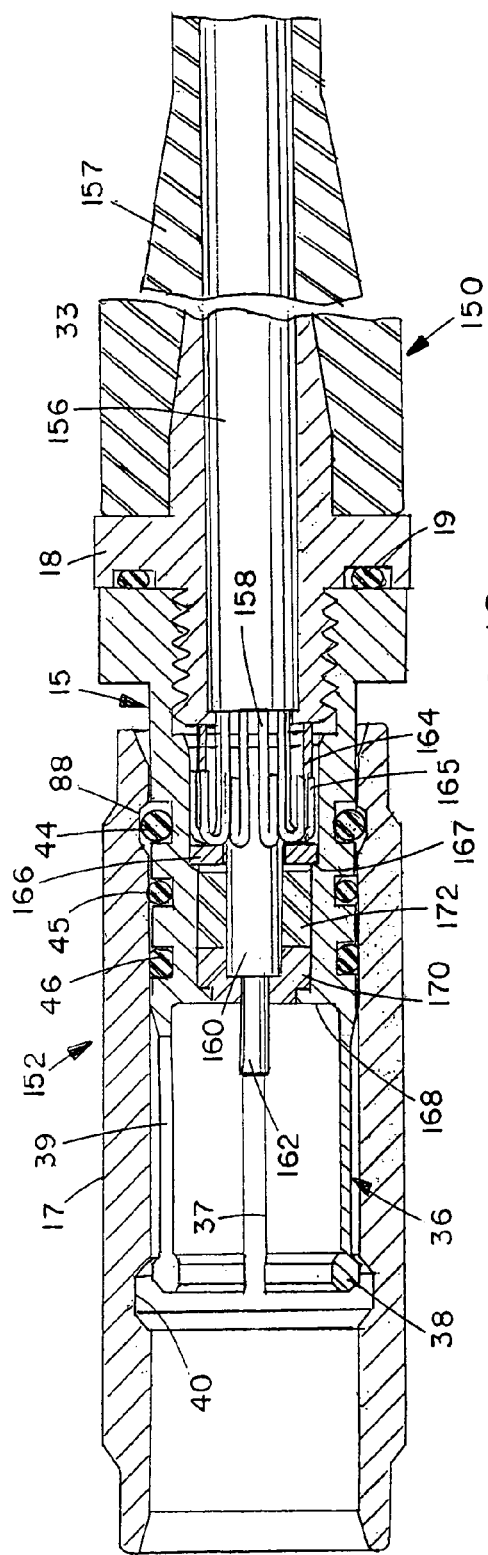
FIG. 12 is a sectional view illustrating the first module of the co-axial cable connector according to another embodiment of the invention.
Figure 13:
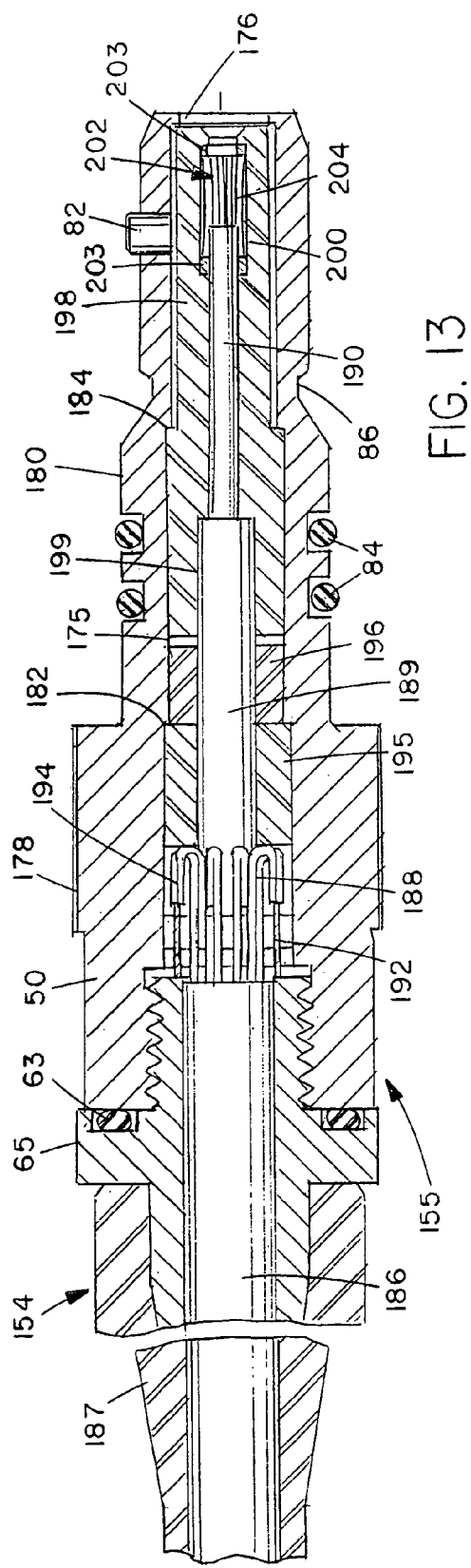
FIG. 13 is a sectional view illustrating the second module of the co-axial cable connector.

FIGS. 1 to 8 illustrate a single contact dry mate connector 10 according to a first embodiment of the present invention. The connector is suitable for harsh environments such as underwater or in other hazardous conditions. Connector 10 basically comprises a first module 12 and a second module 14 releasably securable to the first module 12 via coupling sleeve 17 which is secured to the first module. In the illustrated embodiment, the first module is a receptacle module and the second module is a plug module. However, the arrangement may be reversed with the coupling sleeve mounted on the plug module. Although the drawings illustrate an in-line cable-to-cable connection, it will be understood that the connector may also be provided for connection of a cable to a bulkhead. The modules are designed for a push/pull, snap connection, as described in more detail below. In FIGS. 1 to 8, the connector is a dry mate optical connector for connecting single fiber optical connectors. However, it may alternatively be a dry mate electrical connector for connecting electrical cables, such as co-axial cables as illustrated in FIGS. 12 and 13, or a hybrid connector.

The receptacle module 12 is illustrated in detail in FIGS. 1 to 3, and basically comprises a shell or body 15 of hard plastic or metal, having a stepped through bore 16 with a forward end and a rear end. The locking or coupling sleeve 17 is secured over the forward end of the body 15. A termination nut 18 is secured to the rear end of the body 15. A ferrule seat 20 is sealed in the bore 16, and a first optical ferrule 22 is seated in seat 20 so as to project forwardly from the forward end of body 15. Ferrule 22 has a forward end face 24 having a single optical contact 25 at its center. A single optical fiber 26 extends from reinforced fiber optic cable 28 through a bore in seat 20 and an aligned bore in ferrule 22 up to the front end face 24. The outer end of the fiber is polished in a conventional manner to form the optical contact 25. In order to assemble the module 12, the cable 28 will be stripped to expose a sufficient length of fiber 26, which will then be extended through the epoxy filled bores in the ferrule seat and ferrule, and then cut and polished at its contact end in a conventional manner. A swage tube 30 is secured over the exposed cable armor 31 between the cable end and the rear end of the seat 15. Termination nut 18 is secured in the threaded rear end of the body 15 over the end of the cable. An O-ring seal 19 is mounted on the inner end face of the head of nut 18, between the nut and the rear end face of body 15. A fiber strain relief boot 32 may be secured over the cable and coupled to the stem 33 of the termination nut 18, so as to avoid or reduce any strain in the cable. Said strain relief boot is not sealed to the optical cable in order to avoid potential warping of the fibers. Crush washer 34 is located between the inner end of the termination nut 18 and a shoulder on the ferrule seat 20. The crush washer permits termination nut 18 to fully seat the O-ring seal 19, while still holding the ferrule seat 20 firmly in its forward axial position. A pair of O-ring seals 35 are located on the ferrule seat in sealing engagement with receptacle bore 16.

A locking collet or split skirt 36 projects forwardly from the forward end of receptacle shell or body 14 over the projecting end of ferrule 22. Collet 36 has a series of separate fingers or tines separated by slits 37 to allow flexing of the tines, and a keyway 39 as illustrated in FIG. 3. The tines act in the manner of leaf springs. Each tine has an enlarged end portion or part-annular rib 38 for snap engagement with the plug unit, as described below. In the first or unmated position of the coupling sleeve 17 on the receptacle shell or body 15, as illustrated in FIG. 2, the ribs 38 are all located in an annular indent or groove 40 in the inner surface of the coupling sleeve, spaced a short distance from the forward end of the sleeve.

The coupling sleeve 17 is retained on the body 15 in the unmated position of FIG. 2 by means of a first O-ring 42 on the body 15 which engages in a second annular indent 44 on the inner surface of the coupling sleeve, which is spaced inwardly from the rear end of sleeve 17. Two more O-ring seals 45,46 are mounted on the body 15 at spaced intervals from the first seal 42, and are in sealing engagement with the inner surface of the sleeve. Coupling sleeve 17 has a ridged outer gripping surface 48, as best illustrated in FIGS. 1 and 3.

The plug unit 14 will now be described in more detail with reference to FIGS. 4 and 5. The unit basically comprises a body or shell 50 of hard plastic or metal, having a stepped through bore 52, and a fiber optic ferrule 54 of ceramic or similar material seated in a ferrule seat 55 slidably mounted in a front end portion of the bore 52 and biased forwardly by a biasing spring 56 mounted in the bore to the rear of an enlarged head portion 58 of the ferrule seat. Enlarged head portion 58 is seated against a shoulder or stop 59 in bore 52. The seat 55 has a rearwardly extending stem portion 60 and a through bore 61 for receiving a single optical fiber 62 which extends from cable 64 which is secured to the rear end of the plug body via a conventional termination nut 65 and fiber strain relief 66. An O-ring seal 63 is mounted on the inner end face of the head of nut 65. Again, there is a gap between strain relief 66 and optical cable 64, and the strain relief is not sealed to the cable.

An outer bushing 68, a gland seal 69, and an inner bushing 70 are mounted in series on the stem portion 60 of the ferrule seat between the end of nut 65 and a small shoulder or stop 71 in bore 52. The seal is in sealing engagement with plug bore 52. The spring 56 extends between bushing 70 and the rear end of the head portion 58 of the ferrule seat. The single optical fiber 62 extends from reinforced fiber optic cable 64 through the bore 61 in seat 55 and an aligned bore in ferrule 54 up to the front end face 72 of the ferrule. In order to assemble the plug unit, the cable 64 will be stripped to expose a sufficient length of fiber 62, which will then be extended through the epoxy filled bores in the ferrule seat and ferrule, and then cut and polished at its contact end in a conventional manner to form the optical contact 74 in end face 72. A swage tube 75 is secured over the exposed cable armor 76 between the cable end and the rear end of the seat 55.

The front or contact end face 72 of the ferrule 54 is recessed inwardly from the forward end 78 of the plug body 50, and a split ceramic alignment sleeve 80 is contained between the shoulder 59 and the forward end 78 of the body. The alignment sleeve and ferrule together form a socket to receive the receptacle ferrule. In an alternative arrangement, the sleeve and ferrule may be replaced by an electrical socket and the mating ferrule with an electrical pin. Replacing the optical fibers with electrical wire would form an electrical connector.

A plug key 82 extends outwardly from the outer surface of the plug body at a location spaced a short distance rearwardly from the forward end 78, for engagement in a corresponding keyway 39 (see FIG. 3) in collet 36 when the plug and receptacle units are mated together. A pair of spaced O-ring seals 84 are mounted in annular grooves on the outer surface of the plug body at a location spaced rearwardly from key 82, and in front of an enlarged diameter gripping portion 85 of the plug body. An annular locking indent or seat 86 is provided on the outer surface of the plug body between the key 82 and the seals 84.

FIGS. 6 to 8 illustrate steps in the mating of the receptacle unit 12 with plug unit 14. This is a simple push and snap-in procedure. As illustrated in FIG. 6, the forward end of the plug unit is pushed into the open forward end of the coupling sleeve, while gripping the gripping portion 85 of the plug body and the outer gripping surface 48 of coupling sleeve 17. As the plug body is pushed farther inwardly, key 82 will enter the aligned keyway 39, and the locking collet tines will expand to slide over the forward end portion of the plug body, with the annular indent 40 permitting the required flexing and expansion of the locking collet tines. At the same time, the forward end of the first ferrule 22 will enter the open forward end of the plug body and slide into the alignment sleeve 80. Further inward movement of the plug body will bring the front end face 72 of the second or plug ferrule 54 into engagement with the front end face 24 of the first or receptacle ferrule 22, so that the plug ferrule moves further into the plug, compressing spring 56. At the same time, the enlarged end portions 38 of the locking collet tines will snap into engagement with the annular locking indent 86 on the plug body. This is the intermediate position illustrated in FIG. 7.

The coupling sleeve and plug unit are further forced together after the plug body has bottomed out against the receptacle body, in order to move sleeve 17 into the fully locked position of FIG. 8. Further pushing forces the coupling sleeve to slide over the receptacle body, pushing the first O-ring seal 42 out of the indent or detent 44, and capturing the second O-ring seal 45 in the indent. At the same time, the coupling sleeve moves further onto the plug body, so that both O-ring seals 84 are sealed in the bore, and the detent or seat 86 which has captured the enlarged ends or rib 38 of the locking fingers or tines will move away from indent 40, so that the tines are locked into the detent 86, thereby locking the two halves of the connector together. The mating and sealing of the plug and receptacle are therefore simultaneously accomplished by a simple push to connect, seal and lock. The reverse operation, pulling the plug unit away from the receptacle unit while gripping the locking sleeve and plug gripping surface 85, will disconnect the two units. Thus, a single push or sliding motion in the direction of mating both connects and locks the units, and a simple pull in the opposite direction will unlock and separate the connector units. The same gripping surfaces are used for both the mating and the disconnect or de-mating operation.

When the plug and receptacle are fully mated as in FIG. 8, the front end faces of the ferrules are held in face-to-face engagement by spring 56, with the exposed optical contacts 25 and 74 in optical engagement, connecting optical fiber 26 to optical fiber 62. The chamber defined within the coupling sleeve bore in which the mating end faces of the ferrules are engaged is sealed by a double O-ring seal at opposite ends of the chamber. The seal is provided by the double O-rings 84 on the plug body sealing against the coupling sleeve bore adjacent the forward end of the bore, and the first and third O-ring seals 42 and 46 on the receptacle body at the opposite end of the bore. The use of three O-ring seals on the receptacle body, with one of the seals engaging in the locking indent 44, ensures that there is always a double O-ring seal between the receptacle body and coupling sleeve. At the same time, the coupling sleeve and receptacle body are releasably secured together in both the unmated position of FIG. 6 and the fully mated position by engagement of one of the three O-ring seals in the indent 44, comprising the outermost seal 42 in the released or unmated position, and the central seal 45 in the fully mated position. This is a simple and effective mechanism for sealing the contact chamber of the dry mate optical connector while securing the coupling sleeve to the receptacle module. The double O-ring seals at each end provide a high pressure barrier against a surrounding environment such as sea water. Once the plug and receptacle are fully mated, the connection can be installed in a hostile environment such as underwater, and the seals will withstand the surrounding harsh and/or pressure environment, protecting the contact faces.

The amount of force required to snap one of the O-ring seals out of the detent or indent 44 to allow the connector units to be mated or separated will be determined by the angle of the side walls of the indent. As indicated in FIG. 2, the side walls of indent 44 are not perpendicular to the inner end face 88, but are tapered outwardly at an angle. This permits O-ring seal 42 of FIG. 2, to snap out of the indent 44 when the parts are forced together. This angle may be varied to increase or reduce the force required for mating or de-mating, if desired.

In the illustrated embodiment of FIGS. 1 to 8, three spaced O-ring seals 42,45 and 46 are provided on the outer surface of the receptacle. It will be understood that these may alternatively be mounted on grooves in the through bore of sleeve 17, with locking indent 44 then provided on the outside of unit 15. The O-ring seals may also be replaced with other types of seals. Additionally, the seals 42 and 45 may be replaced by retention rings or snap rings for releasable snap engagement in indent 44 in the two positions of FIGS. 6 and 8, in which case the seal 46 provides a single seal at the rear end of the contact chamber. This will normally provide a sufficient seal or barrier at the end of the chamber, but the illustrated arrangement provides an additional, back-up seal in each position. The two seals 84 on the plug member may also be replaced by a single seal. It will be understood that, although the socket 80 is provided on the plug unit in the illustrated embodiment, the arrangement may be reversed in other embodiments, with the contact 54 on the plug body projecting forwardly from the end of the plug unit and the contact 22 being recessed inwardly to provide a socket to receive the plug contact. These alternative arrangements may also be used in any of the other arrangements described below.

In the embodiment illustrated in FIGS. 1 to 8, the connector is an in-line, cable-to-cable connector. However, it will be understood that the same apparatus may be used for a bulkhead connector arrangement. In this case, either half of the connector, i.e. either the plug module or receptacle module, may be mounted in a panel or bulkhead. Each of the connector halves is fully sealed axially in the mated and unmated states, and so may be used as a high pressure bulkhead penetrator.

In the illustrated embodiment, the outside of the optical cables are not sealed from the surrounding environment. If necessary, depending on the application, an outer hose 90 may be sealed over each optical cable between a plug unit 14 at one end of a cable 28 and a receptacle unit 12 at the opposite end of the cable, as illustrated in FIG. 9. The hose 90 may be formed from two tubes 92 of polyurethane or the like secured together via a central collapsible accordion or bellows-like portion 94. Each tube 92 is secured to the respective connector module termination nut with a barbed fastener, and the bellows portion 94 also has a barbed fastener at each end for securing to the respective tube end. This arrangement allows the hose 90 to be collapsed axially to permit exposure of the opposite cable ends, so that the cable end portions can be stripped to allow preparation and assembly of the conductors at each end into the respective end connector unit or module 12,14. It also provides a junction for filling of the hose with fluid. For some applications, particularly where the distance between connectors is long, bellows 94 may not be necessary.

The collapsible outer hose arrangement of FIG. 9 may be used for any fluid-filled cable system. It provides a completely sealed system when used with the dry mate connector of FIGS. 1 to 8, allowing the system to be used in the ocean or in other harsh environments while sealing the cable against ingress of water.

Figure 10:
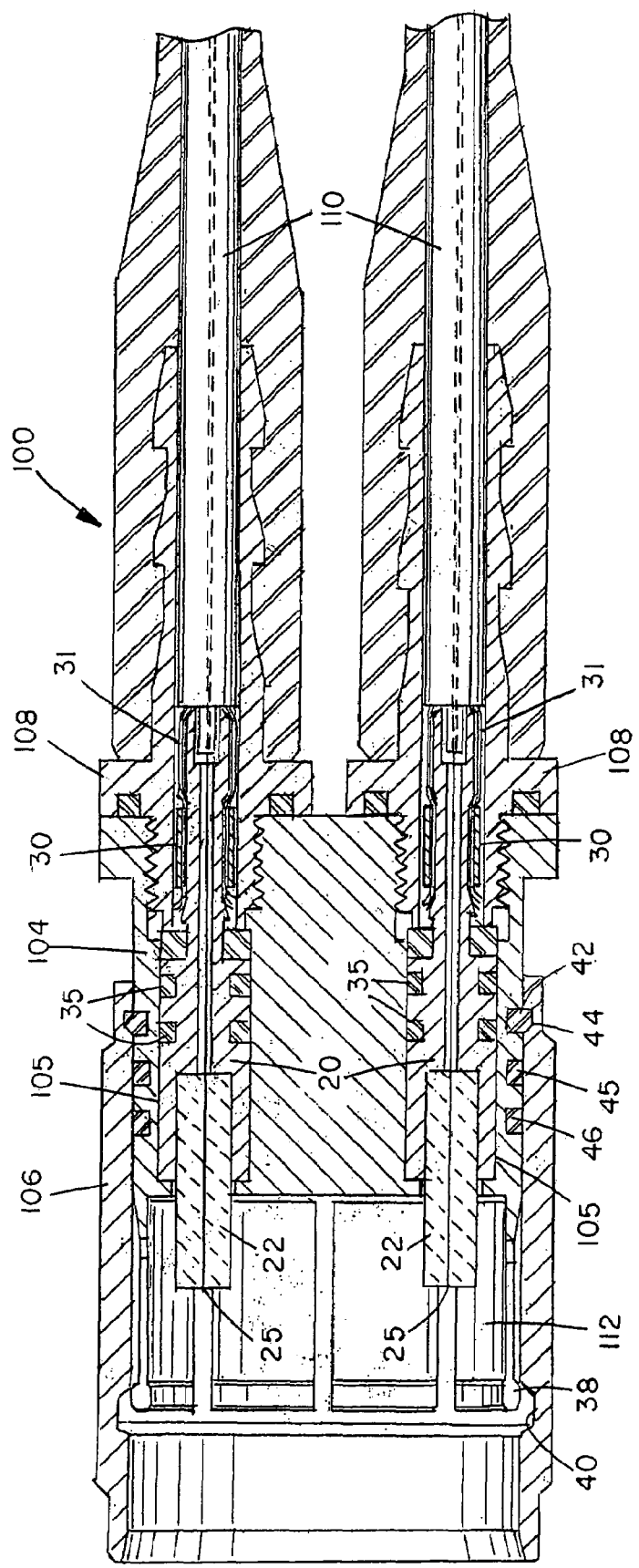
FIG. 10 is a sectional view similar to FIG. 2 illustrating a first module of a multiple contact miniature dry mate connector according to another embodiment of the invention.
Figure 11:
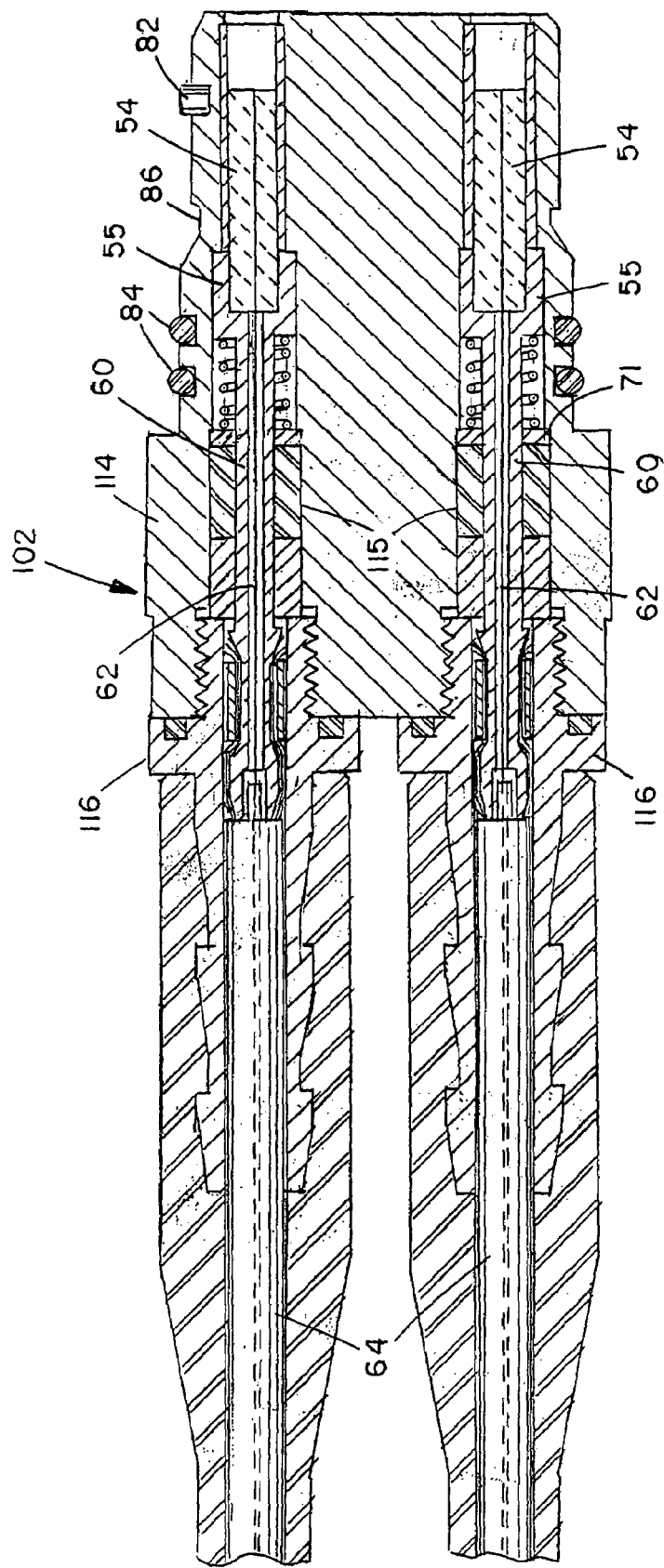
FIG. 11 is a sectional view similar to FIG. 5 illustrating the second module of the multiple contact connector.

The dry mate connector of FIGS. 1 to 8 is a submersible, single optic circuit connector. The overall connector package will be very compact, robust and suitable for use in harsh environments. Although the connector of FIGS. 1 to 8 is a single fiber connector, the same principles may be used in a multiple fiber connector, as illustrated in FIGS. 10 and 11. Some or all of the optical fibers/optical contacts could be replaced by wire/electrical contacts to form hybrid or purely electrical connectors.

FIG. 10 illustrates a receptacle unit or module 100 while FIG. 11 illustrates a plug unit of module 102 of a multiple fiber connector according to another embodiment of the invention. The receptacle module 100 comprises a receptacle body 104 having a plurality of through bores 105, with the number of bores depending on the number of fibers to be connected. A coupling sleeve 106 is releasably secured over the forward end portion of body 104. Separate termination nuts 108 are secured in the rear ends of each respective bore 105, and a separate fiber optic cable 110 is terminated in each termination nut. The fiber guide structure in each bore 105 is identical to that of the single fiber unit of FIGS. 1 to 8, and like reference numerals have been used for like parts as appropriate. A locking collet comprising a plurality of spring tines 112 projects forwardly from the forward end of receptacle shell 104 over the projecting ends of ferrules 22.

The outer coupling sleeve 106 is of identical structure, but larger diameter, than the single fiber connector sleeve 17 of FIGS. 1 to 8, and like reference numerals have been used for like parts as appropriate. The receptacle body 104, like body 15, also has three spaced O-ring seals 42,45,46 with the outermost seal 42 engaged in locking indent 44 in the coupling sleeve in the unmated condition of FIG. 10.

The plug module 102 of FIG. 11 comprises a plug body 114 of similar structure but larger diameter than plug body 50 of FIGS. 4 and 5, and has a plurality of through bores 115. Each through bore contains a ferrule 54 and ferrule seat 55 with a similar mounting and fiber management arrangement to that of the previous embodiment, and like reference numerals have been used for like parts. Apart from the change in diameter and the multiple fiber and ferrule arrangement, other parts of the plug unit are also identical to those of the previous embodiment, and like reference numerals have been used for like parts. A termination nut 116 is secured in the rear end of each bore 115, and a cable 118 is secured to each nut 116, with the exposed end of a respective optical fiber 62 extending from each cable through the bore 61 in ferrule seat 55 and into the aligned ferrule 54.

The arrangement of FIGS. 10 and 11 may be used for connecting two, three, four or more cables together in end-to-end alignment. As in the single fiber connector of FIGS. 1 to 8, the plug and receptacle units are mated using a simple pushing force. The operator simply grips the coupling sleeve and plug unit, then forces the end of the plug unit into the open end of the coupling sleeve until each ferrule 22 enters the aligned bore 115 in the plug body and bottoms out against the end face of the aligned ferrule 54. A further push is then used to shift the outer O-ring seal 42 on the receptacle shell out of indent 44, allowing the coupling sleeve to move outwardly relative to the receptacle shell until the second O-ring seal 45 engages in indent 44 and the captured ends of the locking tines 112 are locked into the indent 86 on the plug body. Again, the chamber containing the multiple optical contacts will be sealed at each end by a pressure resistant, double O-ring seal. As in the previous embodiment, a cable-to-bulkhead connection may be provided in a similar manner, simply by securing either the plug 102 or receptacle 100 in a bulkhead or panel.

FIGS. 12 and 13 illustrate the receptacle and plug modules, respectively, of a co-axial electrical cable connector according to another embodiment of the invention. A co-axial cable has a metallic tunnel or shield through which an insulating layer and a conductor or wire extends. As illustrated in FIGS. 12 and 13, one end of a shielded co-axial cable 156 is terminated in receptacle module 152, while the end of a second shielded co-axial cable 186 is terminated in a plug module 155. Plug module 155 is releasably mateable with the receptacle module 152 in a similar manner to the previous embodiments, and like reference numerals have been used for like parts as appropriate.

The receptacle module basically comprises a rigid conductive shell or body 15 having a stepped through bore 16, and a locking or coupling sleeve 17 secured over the forward end of the receptacle body. The rear end of bore 16 is threaded to receive the threaded end of a termination nut 18 which secures the cable end to the receptacle body. A fiber strain relief boot seal 157 is secured over the cable and coupled to the stem 33 of termination nut 18. The boot seal 157 is sealed to the cable jacket as illustrated, in order to prevent flooding of the shield termination areas.

The outer casing of the coaxial cable 156 is stripped to expose the core of the cable at the junction with the receptacle body. The core, comprising shield wires 158 surrounding dielectric cover layer 160 and central electrical wire 162, then extends into the bore 16. A shield bushing 164 surrounds shield wires 158 in a rear end portion of the receptacle bore 16, and the shield wires are cut off in this region, with the ends 165 of the wires bent back over the end of bushing 164 so that they contact the surface of bore 16 to provide electrical contact between the receptacle shell 15 and the shield. A rear spacer ring 166 is mounted on cover layer 160 adjacent the bent over portions of the wires 158 and acts as a spacer between the shield wires 158 and a shoulder 167 in the bore 16.

The dielectric cover layer 160 projects forwardly from shield bushing 164 and is cut back to expose the electrical wire 162, which projects forwardly from the end face 168 of the shell body into the region surrounded by locking collet 36, in a similar manner to the optical ferrule 22 in FIG. 2. A keyway 39 and slots 37 are provided in collet 36. A front insulator plug or dielectric bushing 170 is mounted over the end of cover layer 160 and extends over the wire 162 up to end face 168, keeping the wire centered and away from contact with the conductive shell 15. A gland seal 172 is mounted over cover layer 160 behind bushing 170, between layer 160 and the inner surface of bore 16.

As the termination nut 18 is screwed into the rear end of the receptacle shell 15, the shield bushing 164 will be advanced inwards, dragging the shield wires 158 with it. This traps the shield wire ends between bushing 164 and the receptacle shell bore, ensuring electrical contact between the shield wires and the shell. It also acts to mechanically terminate the cable, so that it cannot pull out of the receptacle shell.

A similar termination arrangement is provided in the plug module 155. Plug module 155 is illustrated in FIG. 13 and has a similar outer body or shell 50 to the plug shell of the single fiber connector, as illustrated in FIG. 5. Shell 50 in this case is of electrically conductive material (such as metal) and has a through bore 175 having several steps in diameter terminating in forward end opening or socket 176. The outer surface of the shell 50 is also stepped, having an enlarged rear end portion 178 and a forward end portion or stem 180 of reduced diameter for engagement in the forward end of the receptacle coupling sleeve 17. As in the previous embodiments, a pair of O-ring seals 84 are mounted in annular grooves on the outer surface of stem 180 adjacent the rear end portion 178 of the shell, and an annular locking indent or seat 86 is spaced forwardly from the seals 84. An alignment key 82 is located in front of seat 86, as in the embodiment of FIG. 5, for engaging keyway 39 for alignment purposes during mating. Cable 186 is secured at the rear end of the plug body via a termination nut 65 and boot seal 187. Boot seal 187 is sealed to the jacket of cable 186. Unlike the optical connectors of FIGS. 1 to 11, the coaxial electrical connector of FIGS. 12 and 13 must have a boot seal on each side which seals to the cable jackets in order to prevent flooding of the shield termination areas.

The enlarged rear end portion of the plug shell through bore 175 is threaded for engagement with the termination nut 65 which secures cable 154 to the rear end of the plug shell. The bore has three successive portions of gradually reduced diameter between the threaded rear end portion and forward end opening 176, separated by shoulders or steps 182 and 184. The cable 154 is terminated in the bore 175 in a similar manner to the receptacle shell termination described above in connection with FIG. 12. The outer casing 186 is cut back to the end of termination nut 65 so that the shield wires 188, dielectric cover 189, and central wire 190, project forwardly from the nut 65 into bore 175. A shield bushing 192 engages over the shield wires 188 adjacent the exit end of the termination nut 65, and the wire ends 194 are cut and bent back over the outside of bushing 192. A rear bushing 195 of hard plastic is mounted over the dielectric cover 189 between the bent over portions of the shield wires 188 and the first shoulder 182 in the bore. This is pushed forwardly by the shield wires as the termination nut is tightened, until it bottoms out on shoulder 182. In both the receptacle and plug modules, the cut ends of the shield wires are held over a shield bushing in a manner well known for terminating co-axial cables.

A gland seal 196 is mounted over the dielectric cover 189 in front of bushing 195. A plug electrical socket insulator tube 198 extends from the seal 196 up to the forward end of the bore 175. The dielectric cover 189 is cut back to expose a length of the central electrical wire 190. A counterbore 199 at the rear end of the bore in tube 194 receives the end of the dielectric cover, and the wire 190 projects forwardly from counterbore 199 through tube 194 into an enlarged end socket portion 200 of the tube. A contact sleeve 202 is mounted in socket portion 200. Contact sleeve 202 has contact bands 203 at each end of socket portion 200, and a series of spaced, inwardly bent ribs 204 extending between bands 203. Ribs 204 engages around wire 190.

The mating of the two halves of the co-axial cable connector of FIGS. 12 and 13 is similar to that of the single fiber connector of FIGS. 1 to 8, and proceeds in an equivalent manner to that illustrated in the steps of FIGS. 6 to 8. The forward end of the plug unit is pushed into the open forward end of the coupling sleeve, while gripping the gripping or rear end portion 85 of the plug body and the outer gripping surface of coupling sleeve 17. As the plug body is pushed farther inwardly, key 82 will enter the aligned keyway, and the locking collet tines will expand to slide over the forward end portion of the plug body, with the annular indent 40 permitting the required flexing and expansion of the locking collet tines. At the same time, the forward end of the electrical wire 162, which acts as a contact, will enter the forward end opening 176 of the plug body and slide into the contact band 203, which captures and aligns the wire. At the same time, the enlarged end portions 38 of the locking collet tines will snap into engagement with the annular locking indent 86 on the plug body.

The coupling sleeve and plug unit are forced together after the plug body has bottomed out against the receptacle body, in order to move the parts into the fully locked position similar to that illustrated in FIG. 8. Further pushing forces the coupling sleeve to slide over the receptacle body, pushing the first O-ring seal 42 out of the indent or detent 44, and capturing the second O-ring seal 45 in the indent. At the same time, the coupling sleeve moves further onto the plug body, so that both O-ring seals 84 are sealed in the bore, and the detent or seat 86 which has captured the enlarged ends or rib 38 of the locking fingers or tines will move away from indent 40, so that the tines are locked into the detent 86, thereby locking the two halves of the connector together. The mating and sealing of the plug and receptacle are therefore simultaneously accomplished by a simple push to connect and lock. The reverse operation, pulling the plug unit away from the receptacle unit while gripping the locking sleeve, will disconnect the two units. As in the previous embodiments, a simple push or sliding motion in the direction of mating both connects and locks the units together, and a simple pull apart in the opposite direction will unlock and separate the units.

The dry mate connector of this invention is compact, relatively simple to operate and inexpensive in structure, yet provides a durable pressure seal or barrier at each end of the contact chamber when the two modules are mated and locked together. This makes it suitable for use in harsh environments such as underwater. Very high performance is provided in a very compact and robust package. Mating of the two halves of the connector is by a simple push-to-connect and lock, and does not require too much force.

Although some exemplary embodiments of the invention have been described above by way of example only, it will be understood by those skilled in the field that modifications may be made to the disclosed embodiments without departing from the scope of the invention, which is defined by the appended claims.

I claim:

1. A dry mate connector, comprising:
   a first module having a forward end and a rear end;
   a second module having a forward end and a rear end;
   a rigid coupling member mounted on the first module for releasably securing the modules together in a mated position;
   the modules and coupling member being relatively movable in a single axial mating motion between an unmated position and a mated, locked position and being movable relative to one another in a single axial unmating motion opposite to the mating motion to release the modules from one another;
   the coupling member and mated modules together forming a closed, locked chamber;
   at least two high pressure seal members being provided between the coupling sleeve and each module at each end of the chamber in the mated position for sealing opposite ends of the chamber, the seal members comprising means for forming a high pressure barrier against a surrounding high pressure environment; and the first and second modules each having at least one forwardly facing contact for communication with the contact of the other module within the chamber in the mated position.

2. The connector as claimed in claim 1, wherein the coupling member comprises a sleeve projecting forwardly from the forward end of the first module for receiving the forward end of the second module in the mated position, the chamber being defined within the sleeve.

3. The connector as claimed in claim 1, wherein the seal members comprise O-ring seals.

4. The connector as claimed in claim 1, wherein the modules have interengageable snap lock formations for releasably securing the modules together in the mated position.

5. The connector as claimed in claim 4, wherein the coupling member holds the interengageable formations of the modules in locking engagement in the mated position.

6. The connector as claimed in claim 1, wherein the coupling member is movable relative to the first module between a first locking position when the modules are unmated and a second locking position when the modules are mated, the coupling member and first module having opposing inner and outer surfaces, respectively, one of said surfaces having a locking detent and the other of said surfaces having first and second spaced locking members for releasable locking engagement in the locking detent in the first and second locking positions, respectively.

7. The connector as claimed in claim 1, wherein the contacts are electrical contacts.

8. The connector as claimed in claim 1, wherein the contacts are optical contacts.

9. A connector as claimed in claim 8, wherein a first ferrule is mounted in the first module and a second ferrule is mounted in the second module, each ferrule having a forward end face for face-to-face engagement with the forward end face of the other ferrule in the mated condition, the optical contacts being located at the forward end faces of the respective ferrules.

10. The connector as claimed in claim 9, wherein a first, single fiber optical cable is secured to the rear end of the first module and a second, single fiber optical cable is secured to the rear end of the second module, a single optical fiber in the first cable extending through the first module and first ferrule up to said forward end face, the first fiber having a forward end comprising the first optical contact, a single optical fiber in the second cable extending through the second module and second ferrule up to said forward end face, the second fiber having a forward end comprising the second optical contact, whereby said connector comprises an in-line cable-to-cable connector.

11. The connector as claimed in claim 8, wherein one of said modules includes means for securing the unit in a bulkhead and a cable is secured to the rear end of the other unit, whereby said connector comprises a bulkhead feedthrough connector.

12. The connector as claimed in claim 1, wherein the coupling member and second module each have a single outer gripping surface for gripping by a user when moving the modules in both the mating and unmating motions.

13. The connector as claimed in claim 1, wherein the first module has a plurality of first contacts seated therein and the second module has a plurality of second contacts seated therein equal in number to the number of first contacts, each first contact being in signal communication with a corresponding second contact in the mated position.

14. A connector, comprising:
a first module;
a second module;
a coupling sleeve mounted on the first module for releasably securing the modules together in a mated position, the coupling sleeve having a forward end, a rear end, an inner surface, and a first through bore;
each module having a forward end and a rear end, the forward end of the coupling sleeve being spaced forwardly from the forward end of the first module and receiving the forward end of the second module in the mated position;
a first contact seated in the first module;
a second contact seated in the second module;
the first contact being connected with the second contact in the mated position;
the modules each having outer surface portions located within the coupling sleeve in the mated position;
at least one high pressure seal member between the outer surface portion of each of the modules and the inner surface of the coupling sleeve in the mated position to define a sealed chamber in the coupling sleeve between the seal members in which the contacts are located, whereby the chamber has a high pressure seal at each end to protect the contacts from a surrounding high pressure environment when the connector is deployed; and
whereby relative movement between the modules in a single, first direction mates, locks and seals the modules in the mated position and relative movement in a single, second direction opposite to the first direction unlocks and releases the modules to allow them to be separated, the coupling sleeve and modules together forming a closed, locked and sealed chamber in the mated position.

15. The connector as claimed in claim 14, wherein the first module has a plurality of resilient locking tines extending forwardly from its forward end, the tines having enlarged end portions, and the outer surface portion of the second module has an annular locking indent for releasable snap engagement with the enlarged end portions of the tines when the modules are moved into mating engagement, the high pressure seal member on said first module being spaced from said locking tines.

16. The connector as claimed in claim 15, wherein said coupling member comprises a sleeve projecting forwardly from the first module for receiving the forward end of the second module during mating, the sleeve being movable relative to the first module during mating between a first, unmated position and a second, mated position, the sleeve having an indent for alignment with said enlarged end portions when said coupling sleeve is in said first locking position, whereby said tines can flex over said second module when said second module is pushed into said coupling sleeve, and said indent in said sleeve is moved away from said tines in said second mated position, whereby the inner surface of said coupling sleeve holds said enlarged end portions of said tines in said annular locking indent on the second module when said modules are in mating engagement.

17. The connector as claimed in claim 14, wherein the outer surface of the second module has an indent and a snap lock member extends forwardly from the forward end face of the first module for snap lock engagement in the indent when the modules are pushed into mating engagement.

18. The connector as claimed in claim 14, wherein the first module has a snap lock member and the second module has an indent for releasable snap engagement with said snap lock member when the modules are mated, the coupling sleeve having a second indent on its inner surface which is aligned with the snap lock member when the modules are separated, whereby the snap lock member is free to snap over the forward end of the second module and into the indent on the second module as the parts are mated, the second indent moving out of alignment with the snap lock member when the coupling sleeve moves into the second, mated position, whereby the snap lock member is locked in the indent on the second module by the coupling sleeve to hold the modules together.

19. A connector, comprising:
a first module;
a second module;
a coupling sleeve slidably mounted on the first module for releasably securing the modules together in a mated position, the coupling sleeve having a forward end, a rear end, and a first through bore;
each module having a forward end and a rear end, the forward end of the coupling sleeve being spaced forwardly from the forward end of the first module and slidably receiving the forward end of the second module in the mated position;
a first contact seated in the first module;
a second contact seated in the second module;
the first contact being connected with the second contact in the mated position;
the modules each having outer surface portions located within the coupling sleeve in the mated position;
at least one high pressure seal member between the outer surface portion of each of the modules and the coupling sleeve through bore in the mated position to define a sealed chamber in the coupling sleeve between the seal members in which the contacts are located, whereby the chamber has a high pressure seal at each end to protect the contacts from a surrounding high pressure environment when the connector is deployed;
whereby relative movement between the modules in a single, first direction mates, locks and seals the modules in the mated position and relative movement in a single, second direction opposite to the first direction unlocks and releases the modules to allow them to be separated, the coupling sleeve and modules together forming a closed, locked and sealed chamber in the mated position; and
the coupling sleeve having a first indent at a spacing from its rear end, and the first module having first and second spaced retention members spaced rearwardly from the forward end of the first contact, the coupling sleeve moving relative to the first module as the modules are mated together between a first, unmated position in which the first retention member engages in the first indent to retain the coupling sleeve on the first module, and a second, mated position when the modules are mated together in which the second retention member engages in the first indent.

20. The connector as claimed in claim 19, wherein said one seal member comprises a first seal member on the first module and said first seal member is spaced from said second retention member in a direction towards the forward end of said coupling sleeve.

21. The connector as claimed in claim 20, wherein said retention members also comprise seal members when not engaged in said first indent.

22. A cable assembly, comprising:
an elongate cable having a first end and a second end and at least one circuit extending through said cable;
a first connector half secured to the first end of the cable;
a second connector half secured to the second end of the cable;
each connector half containing a contact communicating with said circuit, and comprising one half of a releasably mateable connector;
an outer, fluid-filled hose extending over said cable and having a first end sealed to the first connector half and a second end sealed to the second connector half;
the hose having a central, collapsible section for allowing the hose to be collapsed axially to expose the cable ends for assembly of the circuit into the connector halves; and
the hose being formed in three separate parts, comprising a first, non-collapsible hose portion extending from the first connector half, a second, non-collapsible hose portion extending from the second connector half, and said collapsible section connecting said first and second hose portions, the first and second hose portions each being longer than said central, collapsible section.

23. The assembly as claimed in claim 22, wherein the circuit comprises at least one optical fiber and the contacts are optical contacts, whereby the collapsible section of the hose is collapsed axially to expose the cable ends for assembly of the fiber into the connector halves, opposite ends of said fiber comprising said optical contacts.

24. The assembly as claimed in claim 22, wherein the collapsible section comprises an accordion-like structure.

25. A cable assembly, comprising:
an elongate cable having a first end and a second end and at least one circuit extending through said cable;
a first connector half secured to the first end of the cable;
a second connector half secured to the second end of the cable;
each connector half containing a contact communicating with said circuit, and comprising one half of a releasably mateable connector;
an outer, fluid-filled hose extending over said cable and having a first end sealed to the first connector half and a second end sealed to the second connector half;
the hose having a central, collapsible section for allowing the hose to be collapsed axially to expose the cable ends for assembly of the circuit into the connector halves;
a coupling sleeve slidably mounted on the first connector half for releasably securing the first connector half to a second connector half on another cable in a mated position, the coupling sleeve having a forward end, a rear end, and a first through bore, the forward end of the coupling sleeve being spaced forwardly from the forward end of the first connector half and slidably receiving the forward end of a second connector half in the mated position, a first contact seated in the forward end of the first connector half, a second contact mounted in said second connector half for communication with the corresponding contact in a mating connector half when the connector halves are mated together, the circuit extending through the connector halves and having opposite ends comprising said contacts, the connector halves and coupling sleeve together forming a closed, locked and sealed chamber in a mated position, at least one high pressure seal member being provided between the coupling sleeve and each connector half at each end of the chamber in the mated position for sealing opposite ends of the chamber, the seal members forming a high pressure barrier against a surrounding high pressure environment, and the connector halves and coupling sleeve being relatively movable in a single axial mating motion between an unmated position and the mated position, and being movable relative to one another in a single axial unmating motion opposite to the mating motion to release the connector haves from one another.

26. A dry mate connector, comprising:
a first module having a forward end and a rear end;
a second module having a forward end and a rear end;
a coupling sleeve mounted on the first module for releasably securing the modules together in a mated position, the coupling sleeve having a forward end spaced forwardly from the forward end of the first module for receiving the forward end of the second module in the mated position, a rear end, and a first through bore defining a contact chamber;
the modules each having at least one forwardly facing contact for communication with the contact of the other module within the contact chamber of the coupling sleeve in the mated position;
at least two spaced high pressure seal members located between each module and the through bore of said coupling sleeve in the mated position to provide a double seal at each end of said contact chamber against a surrounding, high pressure environment; and
a releasable locking mechanism for locking the modules together in the mated position, relative movement between the modules and coupling sleeve in a single, axial mating direction achieving mating and locking of said modules together, and relative movement between the modules and sleeve in a single, axial unmating direction opposite to said mating direction releasing said locking mechanism and allowing separation of said modules.

27. The connector as claimed in claim 26, wherein the modules have interengageable locking formations which are in releasable, locking engagement to secure the modules together in the mated position.

28. The connector as claimed in claim 27, wherein the coupling sleeve is movable on the first module between a first locking position when the modules are unmated and a second locking position when the modules are mated, the coupling sleeve having an inner surface and the modules having outer surface portions facing said inner surface in the mated position, one of the opposing inner and outer surfaces of the coupling sleeve and first module having a locking indent and the other of said surfaces having a pair of spaced locking members for releasable locking engagement in said locking indent in the first and second locking positions, respectively.

29. The connector as claimed in claim 28, wherein the coupling sleeve holds the interengageable formations of the modules in locking engagement when in the second locking position.

30. The connector as claimed in claim 26, wherein said seal members comprise O-ring seals.

31. The connector as claimed in claim 26, wherein the contacts comprise co-axial cable wire ends, and the connector comprises a co-axial electrical cable connector.

* * * * *